United States Patent [19]

Hettich

[11] Patent Number: 4,688,742

[45] Date of Patent: Aug. 25, 1987

[54] STRIP MEDIA TENSIONING SYSTEM

[75] Inventor: Adam J. Hettich, Orange, Calif.

[73] Assignee: Datametrics Corporation, Chatsworth, Calif.

[21] Appl. No.: 705,881

[22] Filed: Feb. 26, 1985

[51] Int. Cl.$^4$ ............ G11B 15/32; G11B 15/43; F16H 7/10; F16D 63/00

[52] U.S. Cl. ............ 242/192; 242/206; 360/96.4; 474/112; 474/199; 188/83; 188/74

[58] Field of Search ........... 242/192, 206, 75, 199, 242/75; 226/190, 191, 194; 188/74, 78, 83; 474/112, 199; 384/255, 543, 546, 586, 587; 360/96.1, 96.3, 96.4

[56] References Cited

U.S. PATENT DOCUMENTS 4,162,774  7/1979  Bowers ............... 242/192
4,242,709 12/1980  Stricker ............. 242/75 X
4,491,195  1/1985  Mikkelsen et al. ..... 384/255 X Primary Examiner—Stuart S. Levy
Assistant Examiner—David Werner
Attorney, Agent, or Firm—Marvin H. Kleinberg

[57] ABSTRACT

A strip media tensioning system is set forth for imposing drag on a moving band such as a circulating endless belt for driving reel packs for delivery of magnetic tape therebetween. More particularly, an apparatus is set forth which includes a fixed shaft. A sleeve is journalled for rotation about the shaft, the endless belt engaging and rotating the sleeve. To create drag, a visco-elastic ring is positioned between the shaft and sleeve and is compressed against the sleeve creating drag by an eccentrically disposed roller device. The eccentricity of the roller device is adjustable for altering the drag on the circulating endless belt.

19 Claims, 8 Drawing Figures

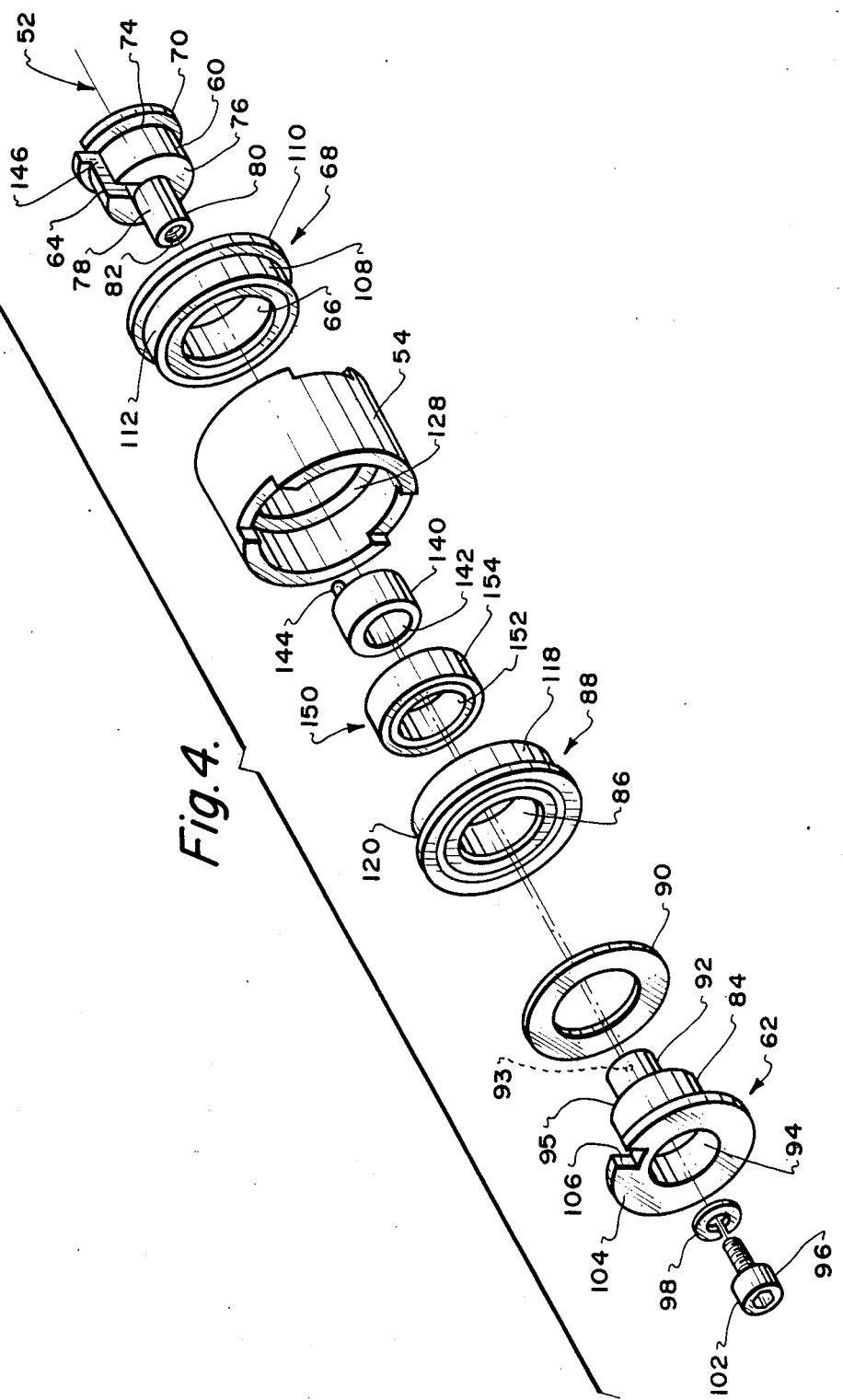

STRIP MEDIA TENSIONING SYSTEM

FIELD OF THE INVENTION

This invention relates to strip media drive systems and more particularly to strip media drive systems having a pair of belt coupled strip media packs for reeling the strip media therebetween. Of particular interest is a belt coupled strip media drive embodied in a magnetic tape cartridge.

BACKGROUND OF THE INVENTION

The basic principle of operation for magnetic tape drive systems, cartridge or non-cartridge, that utilize thin, flexible, endless peripheral belts to transfer the tape from one reel pack to another under tension, is the two pulley, flat belt drive. In such a belt drive, one pulley is "the driver" and the other is the "driven" pulley or load. The endless belt contacts each of the reel packs to urge the packs to rotate in the desired manner to transfer the strip media i.e. tape, under tension, between the reel packs past, for example, a read/write head.

In such a system there exists a slack (low tension) and a taut (high tension) side of the endless belt, the taut side always being downstream of the driven pulley in the direction of motion of the belt and between the driver and driven pulley. Since any elastic material stretches under tension, the taut side of the endless belt is thinner than the slack side and since such belt drives are always endless closed loop systems, continuity of mass flow must exist by the laws of physics. This means that at any point in the belt drive, an equal amount of belt mass must pass per unit time. Thus, the velocity of the belt on the taut side of a belt drive must be greater than the velocity of the belt on the slack side by an amount proportionate to the difference in thickness. It follows that with the taut side of the belt engaging the take-up reel pack and the slack side contacting the supply reel pack that the take-up pack is urged to rotate at a greater tangential velocity than the supply reel pack. This, in turn, tensions the tape being transferred between the reel packs.

Magnetic tape cartridges have been produced in varying configurations and in a wide range of capabilities for applications in audio, analog and digital recording. One type of tape cartridge which provides for tension of the strip media is disclosed in U.S. Pat. No. 4,242,709 issued Dec. 30, 1980 to Stricker. This cartridge relies upon rolling friction between engaging rollers to tension the traveling belt trapped therebetween, the belt driving the cartridge reel packs.

SUMMARY OF THE INVENTION

The present invention relates to an apparatus for applying an adjustable drag torque to a moving band. More particularly, the invention relates to a strip media tensioning system which is simple, non-soiling, low cost and which applies a smooth, controlled, adjustable drag torque on to an endless belt which drives strip media such as magnetic tape used in magnetic recording and other applications.

Toward this end, the apparatus for applying drag includes a fixed shaft upon which is journalled a sleeve for rotation thereabout.

A visco-elastic ring is concentrically positioned about the shaft against the inner surface of the outer sleeve. Means for rolling against the ring are eccentrically positioned about the shaft, the rolling means acting to mutually rotate with the outer sleeve and ring and to compress the ring against the outer sleeve to impose drag torque upon the rotation of the outer sleeve and drag upon the moving band.

The rolling friction generated as the rolling means rolls against and compresses the visco-elastic ring to impose a smooth drag upon the engaging band. Drag on the band, which may be an endless belt for strip media applications, results in a taut or tensioned band side (downstream of the apparatus in the direction of belt travel) and a slack band side (upstream of the apparatus). The taut side of the band engages the take-up pack and travels at a faster velocity than the slack side which contacts the supply pack and rotates the reel packs in the desired manner to maintain tension in the strip media. In the preferred embodiment, the eccentricity of the rolling means may be adjusted to increase or decrease the compression of the ring and drag torque and thereby the tension imposed upon the band and the tension in the strip media.

Specifically, for strip media applications, this apparatus is used in conjunction with a take-up reel pack and a supply reel pack. The strip media is typically magnetic recording tape which is wound convolutely onto the two reel packs for delivery therebetween past a read/write head for the transfer of information in a well known fashion. The endless belt couples the rotation of the packs together without slippage between the belt and the tape. Tensioning means embodied as the apparatus according to the present invention creates a drag torque and thereby a greater tension in the belt leaving (i.e., downstream) the apparatus than in the portion of the belt entering or upstream of the apparatus. Due to continuity of mass flow, the thinner, higher tension belt downstream of the apparatus moves at a higher velocity than the belt upstream of the apparatus which urges the take-up reel pack to acquire tape at a faster rate than is paid out from the supply reel. Accordingly, the tape is maintained in tension as it passes from the supply reel to the take-up reel.

As can be appreciated, the tensioning apparatus according to the present invention is believed to be of a much simpler and less costly design than those found in the prior art. Further, elastomeric rollers employed to produce rolling friction and thereby tensioning the belt according to the prior art are no longer required. Degradation and wear of the elastomeric surface may tend to soil the magnetic tape and other components including the read/write head. Also, by providing for adjustment of eccentricity of rolling means against the ring and thereby the drag imposed upon the belt, the tension of the magnetic tape may be easily adjusted.

BRIEF DESCRIPTION OF THE DRAWINGS

These and other features and advantages will become appreciated as the same become better understood with reference to the specification, claims and drawings wherein:

FIG. 4 is an exploded view of the apparatus according to the present invention as shown in FIG. 2;

DETAILED DESCRIPTION

Figure 1:
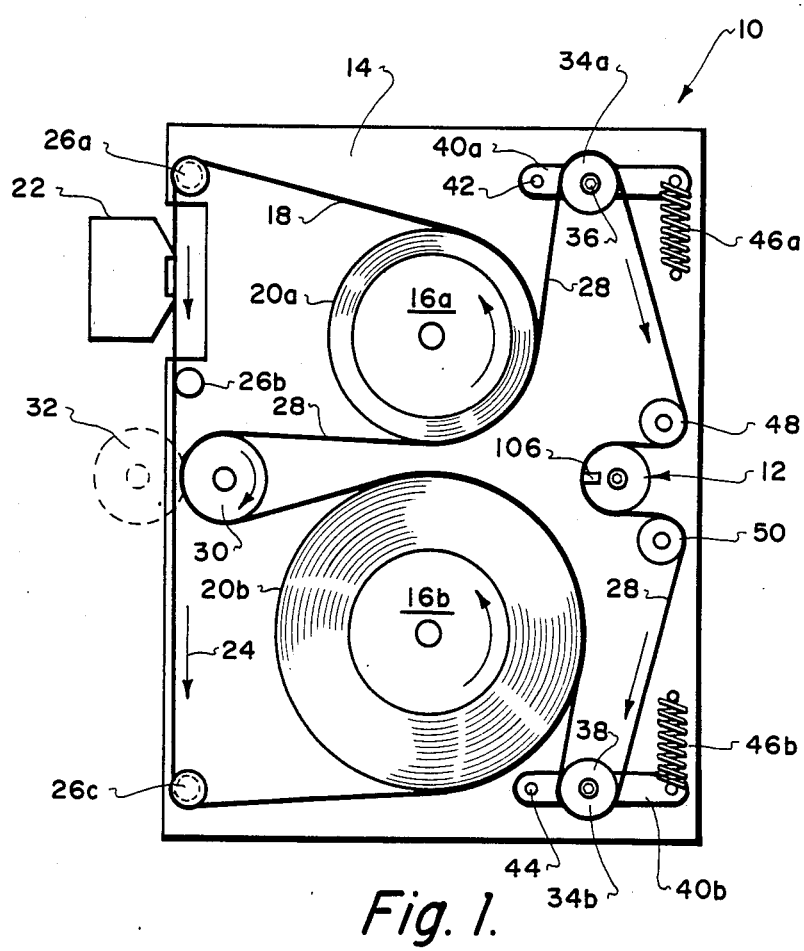
FIG. 1 is a plan view of a magnetic tape cartridge employing the apparatus according to the present invention.

Turning to the drawings, FIG. 1 shows a magnetic tape drive cartridge 10 adapted for high speed, high density digital recording applications, the cartridge including a strip media tensioning apparatus 12 according to the present invention. The cartridge 10 is illustrated and described herein by way of example, it being understood that the tensioning apparatus 12 can have other applications where it is desirous to impose a drag torque upon a band, belt or the like. It is believed, however, that the tensioning apparatus 12 is particularly useful in digital recording applications as described herein.

The cartridge 10 includes a base plate 14 forming the lower part of a housing for the cartridge 10 and securing the components as hereinafter described. Mounted to the base plate 14 by ideally frictionless bearings are reel hubs 16a and 16b on which magnetic tape 18 is convolutely wound defining, respectively, reel packs 20a and 20b. When the hubs 16a and 16b are rotated, the tape 18 is unwound from one reel pack, past a read/write head 22 and onto the other pack. For example, as shown in FIG. 1, the hubs 16a and 16b are rotated in a counterclockwise direction to transfer the tape 18 from supply reel pack 20a past head 22 to take-up reel pack 20b in the direction as shown by arrow 24. It is to be understood that the cartridge 10 can be operated to transfer the tape 18 in the reverse direction; however, the description as hereinafter set forth shall be limited to the transfer of tape as shown in FIG. 1 created by a counterclockwise rotation of the hubs.

To guide the magnetic tape 18 from pack to pack past the read/write head 22, guides 26a-c are provided and may be journalled to the base plate 14 to freely rotate and guide the tape 18 on its designated path.

To rotate the packs 20a and 20b and transfer magnetic tape past the head 22, an endless belt 28 is circulated within the cartridge 10. The belt 28 has a uniform cross-section and elastic modulus throughout its length and may be coated with a thin layer of high coefficient of friction polymer to effect a non-slipping interface with the packs and with the belt driving means. Upon driving the belt 28 the reel packs rotate to transfer the tape 18, under tension, from one reel pack to the other.

To circulate the belt 28 within the cartridge 10, driving means are provided which include a drive capstan 30 journalled to the base plate 14 and driven for a clockwise rotation by an external motor capstan 32. The belt 28 is wrapped about the drive capstan 30 and accordingly when the drive capstan 30 is driven in a clockwise direction by the motor capstan 32 the belt 28 is caused to circulate in a clockwise direction along a designated path within the cartridge 10. The belt path, as defined by the drive capstan 30, and other components as described below directs the belt to wrap about each of the packs 20a and 20b in arc length preferably not less than 75°. By virtue of the non-slipping contact between the belt 28 and the packs, circulation of the belt urges the packs 20a and 20b to rotate in the desired fashion to transfer the tape 18 from one pack to the other.

To maintain the belt 28 in tension within the cartridge 10, and to guide the belt along its path, two belt idlers 34a and 34b are mounted on pins 36 and 38 to brackets 40a and 40b which are pivoted around pins 42 and 44. The brackets 40a and 40b are pivoted at their respective pins 42 and 44 to the base plate 14. The brackets 40a and 40b carrying idlers 34a and 34b are urged by compression springs 46a and 46b in directions that will pre-tension the belt 28.

For trouble free operation, take-up pack 20b must be urged to acquire more tape than supply pack 20a is paying out to maintain the magnetic tape 18 in tension as it travels past the head 22. To obtain this tape tension, the tensioning apparatus 12 according to the present invention is disposed in the path of and tensions the belt 28 as it passes between idler 34a to the other idler 34b. The apparatus 12 is adapted to exert a drag torque upon the belt 28 which imposes a greater tension in the belt between the apparatus 12 and the drive capstan and which engages take-up pack 20b than the tension in the belt lying between the drive capstan 30 and apparatus 12 and which engages supply pack 20a. By continuity of mass flow, the greater tension results in a greater belt velocity which urges the take-up pack 20b to acquire more tape than pack 20a is paying out, thereby tensioning the magnetic tape 18 as it is transferred between the packs.

In the embodiment of the cartridge shown in FIG. 1, the apparatus 12 is positioned symmetrically between the reel packs. Hence, to assure non-slipping engagement of the belt 28 with the apparatus 12, an upstream idler 48 is journalled to base plate 14 between the apparatus 12 and idler 34a and a downstream idler 50 is journalled to base plate 14 between the apparatus 12 and idler 34b. The upstream and downstream idlers 48 and 50 are arranged relative to the apparatus 12 such that the belt 28 is wrapped about the apparatus 12 in arc length preferably about 180°.

Figure 2:
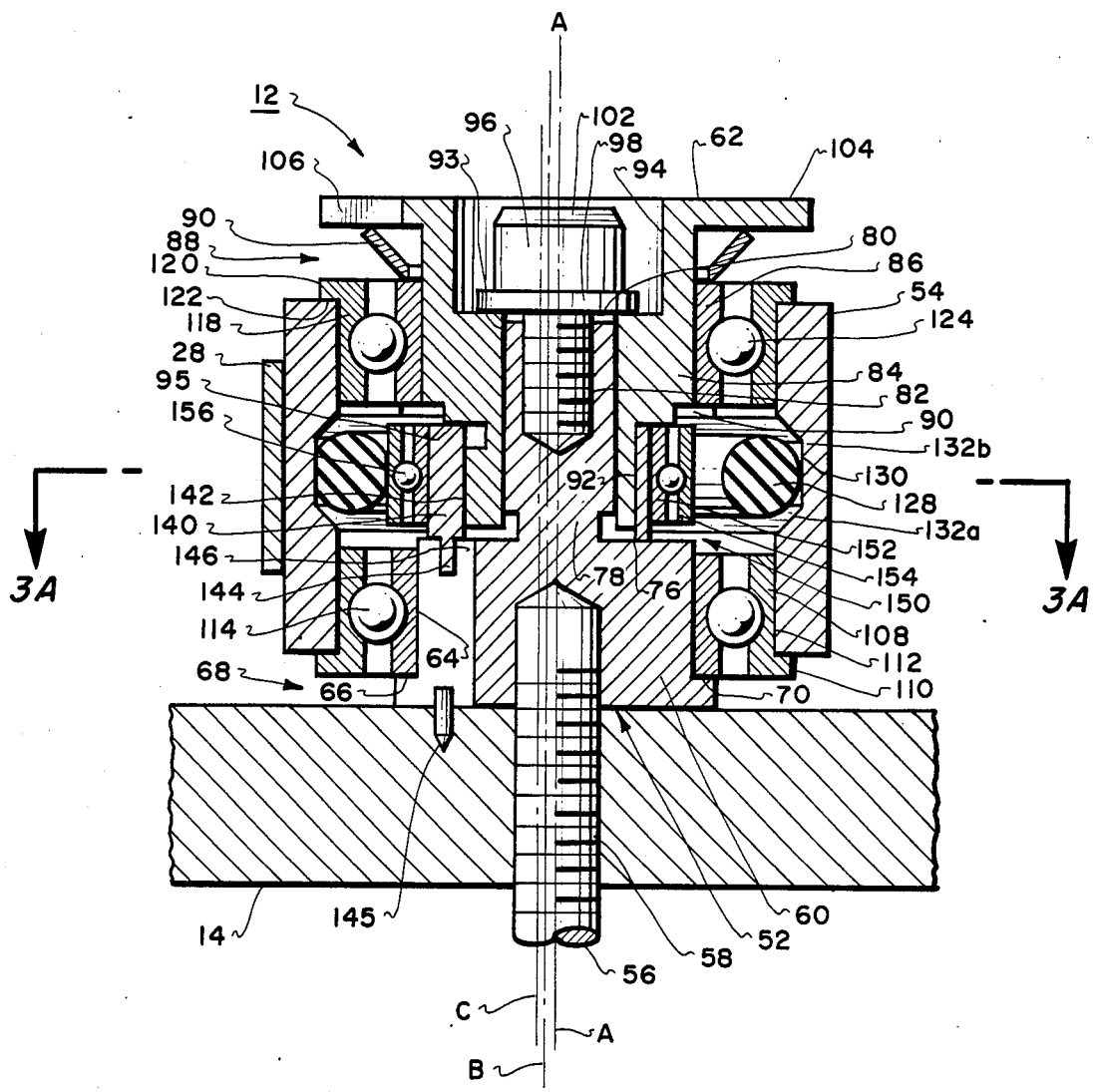
FIG. 2 is a cross section view of one embodiment of the apparatus according to the present invention for imposing drag.

Turning to FIGS. 2 and 4, one embodiment of the tensioning apparatus 12 according to the present invention will now be described. The apparatus 12 includes a fixed shaft 52 to which is journalled an outer sleeve 54. Means are provided between the shaft 52 and outer sleeve 54 including a visco-elastic ring 128 for creating rolling friction that imposes a drag torque opposing the rotation of the outer sleeve 54 around the shaft 52. The belt 28 is in non-slipping contact with the outer sleeve 54 which exerts a drag torque that opposes the circulation of the belt 28 within the cartridge ultimately resulting in the tensioning of the magnetic tape 18 as it is passed between the packs. The shaft 52 is fixed against rotation by a stake pin 145 pressfit into the base plate 14 and received by a slot 146. Shaft 52 is secured to the base plate 14 by a bolt 56 which passes through the base plate 14 and into a coaxial threaded bore 58 in shaft 52. Shaft 52 is two-piece including a fixed base 60 and a cooperating cap 62. Together, the base 60 and cap 62, provide support for the journalling of the outer sleeve 54.

Referring specifically to the base 60, a cylindrical, reduced diameter neck 64 is fashioned thereon and is adapted to support an inner race 66 to a first bearing set 68. Inner race 66 is retained against a radial first shoulder 70 located at the lower terminus of the neck 64.

Opposite the first shoulder 70, the neck 64 terminates at a radially projecting annular second shoulder 76 which defines the transition from the neck 64 to a lesser diameter, coaxially arranged stem 78. The stem 78 serves to mount the cap 62 and projects coaxially from the neck 64 (upwardly in FIG. 2) terminating at a flat, end 80. To provide for the fastening of the cap 62, a threaded coaxial bore 82 extends into the stem 78.

The cap 62 includes a cylindrical body 84 having an outside diameter equal to that of the neck 64, the cap 62 being arranged such that the body 84 and neck 64 are arranged in a common cylindrical envelope. Inner race 86 of a second bearing set 88 is mounted about the body 84.

To provide for the rolling compression of the viscoelastic ring 128 and for varying the compression, the cap 62 includes a lesser diameter cylindrical leg 92 which projects eccentrically from the body 84 toward the second shoulder 76. That is, relative to an axis A which defines the positional and rotational axis for the outer sleeve 54 and the positional axis for the cap body 84, the stem 78 and neck 64, the axis B of the leg 92 is offset for example to the left in FIGS. 2 and 3A. The leg 92 has an axial length such that when the cap 62 is positioned on the stem 78, leg 92 terminates just short of the second shoulder 76. A shoulder 95 is defined between the leg 92 and cap body 84.

To mount the cap 62 to the fixed base 60, a bore 93 is provided axially through the body 84 and through the leg 92 and is adapted to closely receive the stem 78 as best shown in FIG. 2.

A counterbore 94 is coaxially fashioned in the body 84 to receive a fastener such as a screw 96. The screw 96 is threadably received by the bore 82 in the stem 78 and a lock washer 98 is disposed between the bottom of the counterbore 94 and the head of the screw 96. By tightening the screw 96 the cap 62 may be securely coupled to the fixed base 60.

To provide for adjustment of the position of the cap 62 about the stem 78 for purposes discussed below, the cap 62 is provided with a flange 104 having a radially projecting notch 106 at a location thereabout for engagement by a tool such as a spanner wrench or the like. To adjust the position of the cap 62 about the stem 78, the screw 96 is loosened and the cap 62 is rotated relatively to the stem 78 via insertion of an appropriate tool in the notch 106.

As stated above, means are provided for journalling the outer sleeve 54 about the shaft 52. These journalling means include the aforesaid first and second bearing sets 68 and 88. The first bearing set 68 has the inner race 66 which is secured to the neck 64. Cooperating with the inner race 66 the first bearing set 68 also has an outer race 108 which is positioned to engage the outer sleeve 54 for rotation therewith. As shown in FIG. 2, the outer race 108 which is positioned to engage the outer sleeve 54 for rotation therewith. As shown in FIG. 2, the outer race 108 may be of the type including a radially outwardly projecting flange 110 at its lower extremity as shown in FIG. 2 defining an L-shaped seat 112 for receiving the outer sleeve 54. Disposed between the inner and outer races 66 and 108 are a plurality of bearing balls 114 contained in cooperative tracks for the inner and outer races, 66,108.

The second bearing set 88 likewise includes an outer race 118 to engage the outer sleeve 54 for rotation therewith. The outer race 118 of the second bearing set 88 is similar to the outer race 108 for the first bearing set 68 in that it includes at one axial end an outwardly projecting flange 120 defining an L-shaped seat 122 for receiving the outer sleeve 54. Bearing balls 124 are cooperatively disposed between the inner and outer races 86 and 118 within suitable tracks for journalling the rotation of the outer sleeve 54.

As can be best seen in FIG. 2, the flanged outer races for the first and second bearing sets clamp the outer sleeve 54 between their respective flanges 110 and 120 and journal it for rotation about the shaft 52. A spring washer 90 disposed between the flange 104 and the inner race 86 of the second bearing set 88 preloads the bearing sets 68 and 88, retains outer sleeve 54 in position and assures smooth rotational motion.

To impose a drag torque upon the rotation of the outer sleeve 54 about the shaft 52, the elastic ring 128 is retained within a groove 130 fashioned about the inside of the outer sleeve 54 and of a dimension to receive and cradle the ring 128. As shown, the groove 130 may have chamfered walls 132a and 132b to confine the ring 128 therebetween. While the ring 128 is shown as having a round crossection, it should be understood that it could be square in cross-section, rectangular, oval or the like. As the ring 128 and outer sleeve 54 mutually rotate without relative movement therebetween, the ring 128 at a certain point along its circumference is compressed against the outer sleeve 54 by rolling means eccentrically positioned relative to the center of rotation of sleeve 54 (axis A). This deformation of ring 128 results in rolling friction which translates into a drag torque being applied to the outer sleeve 54.

As stated above, the ring 128 is compressed by rolling means positioned eccentrically relative to the shaft axis A. As shown in FIGS. 2-4, these rolling means may include a standard ball, roller or journal bearing mounted on an inner eccentric sleeve 140 provided about the leg 92 and acting in cooperation therewith to provide for variable adjustment of the eccentricity of the rolling means. The inner sleeve 140 is also eccentric having an inner bore 142 to closely pass the inner sleeve over the leg 92. This eccentric offset is shown as the distance between axes B and C. The inner sleeve 140 lies between the shoulder 76 of the fixed base 60 and the shoulder 95 for the cap 62. By tightening the screw 96 the cap 62 forcibly clamps the inner sleeve 140 between the aforementioned shoulders and prevents any motion between sleeve 140 and fixed base 60 after the final drag torque adjustment has been made.

To prevent rotation during adjustment of the eccentricity, the inner sleeve 140 includes a pin 144 which is received within a slot 146 fashioned in the neck 64.

During adjustment of the eccentricity of the rolling means, the inner sleeve 140 moves laterally (right to left in FIGS. 2, 3 and 3B), the pin 144 preventing the inner sleeve 140 from rotating, between a maximum eccentric position (FIG. 3A) to an intermediate eccentric position (FIG. 3B) to a minimum eccentric position. This results in, respectively, a maximum, intermediate and minimum drag torque.

Figure 3B:
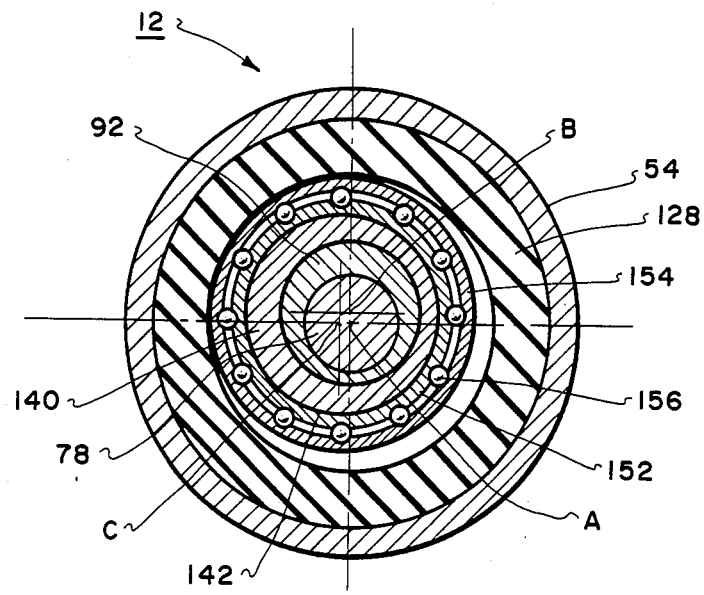
FIG. 3B is a view similar to that of 3A, illustrating the adjustment of the eccentricity of the ring and thereby the drag.
Figure 3A:
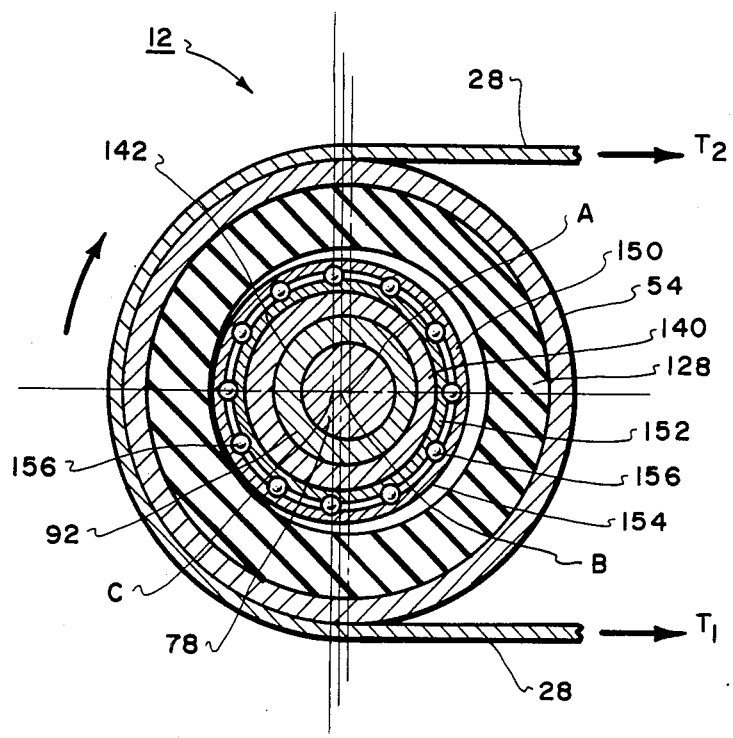
FIG. 3A is a plan view of the apparatus according to the present invention taken along line 3A—3A of FIG. 2 in the direction of the appended arrows.

Specifically with reference to FIG. 3A, to obtain a maximum eccentric position for the inner sleeve 140, and hence maximum drag torque, the cap 62 is positioned relative to the base 60 such that axis B falls between and along a radial line intersecting axes A and C. Viewing FIG. 3A this condition is illustrated. As can be appreciated the individual eccentricities for the leg 92 and inner sleeve 140 are thusly additive and result in maximum eccentricity.

With reference to FIG. 3B an intermediate eccentric condition is shown. In this position the cap 62 has been rotated 90° clockwise from the position of FIG. 3A so as to locate axis B for the leg 92 in line with axis A. The inner sleeve 140 via pin 144 is prevented from rotating and hence, during the rotation of the cap 62, is caused to be drawn from left to right from the maximum eccentric position to the position illustrated. Axis C for the inner sleeve 140 is accordingly drawn nearer axis A. When cap 62 is positioned such that axis A lies between axes B and C a minimum eccentric or concentric position is achieved, and hence no drag torque condition is obtained.

Cooperating with the eccentric mounting means rolling means are provided about the inner sleeve 140. For this purpose, a third bearing set 150, which may be a ball bearing, roller bearing, journal or sleeve bearing is provided. The third bearing set 150 may include, as shown in FIG. 2, an inner race 152 engaging the outer surface of the rotationally fixed, eccentric inner sleeve 140 and an outer race 154 to roll against and compress the ring 128. Bearing balls 156 separate the inner and outer races 152 and 154 and are received in cooperative tracks to journal the outer race 154 for rotation relative to and about the inner sleeve 140.

Ring 128 is positioned about and is engaged by the outer race 154 of the third bearing set 150. Accordingly, the ring 128 is trapped between the outer sleeve 54 and the eccentrically mounted third bearing set 150 and more particularly its outer race 154. In this fashion, the rolling means are eccentrically journalled about the shaft 52. Further, the eccentricity of the rolling means relative to axis A can be adjusted by rotating the cap 62.

Referring to FIG. 3A, belt 28 is wrapped about the tensioning apparatus 12 and more specifically the outer sleeve 54. As the belt 28 is circulated, the outer sleeve 54 and ring 128 mutually rotate about axis A. The eccentrically displaced rolling means (i.e., third bearing set 150) rotates about axis C and compresses the visco-elastic ring 128 over a portion of its circumference, peaking at the maximum point of eccentricity, as it rolls together with the ring 128 and sleeve 54 and then relaxes the ring again. The energy loss from the visco-elastic recovery of the ring 128 from its compressed state creates rolling friction which resists such rotation. Rolling friction creates a drag torque upon the outer sleeve 54. Drag torque, in turn, results in the belt having a taut portion under tension $T_2$ and a relatively slack portion under a lesser tension $T_1$. The belt portion under tension $T_2$ contacts take-up reel pack 20b whereas belt portion under tension $T_1$ contacts supply reel pack 20a. Under the law of continuity of mass flow, the belt portion contacting reel pack 20b moves faster than that portion contacting reel pack 20a. Ultimately, the foregoing results in take-up reel pack 20b being urged to acquire tape faster than supply reel pack 20a is paying out which advantageously tensions the tape 18.

Figure 5:
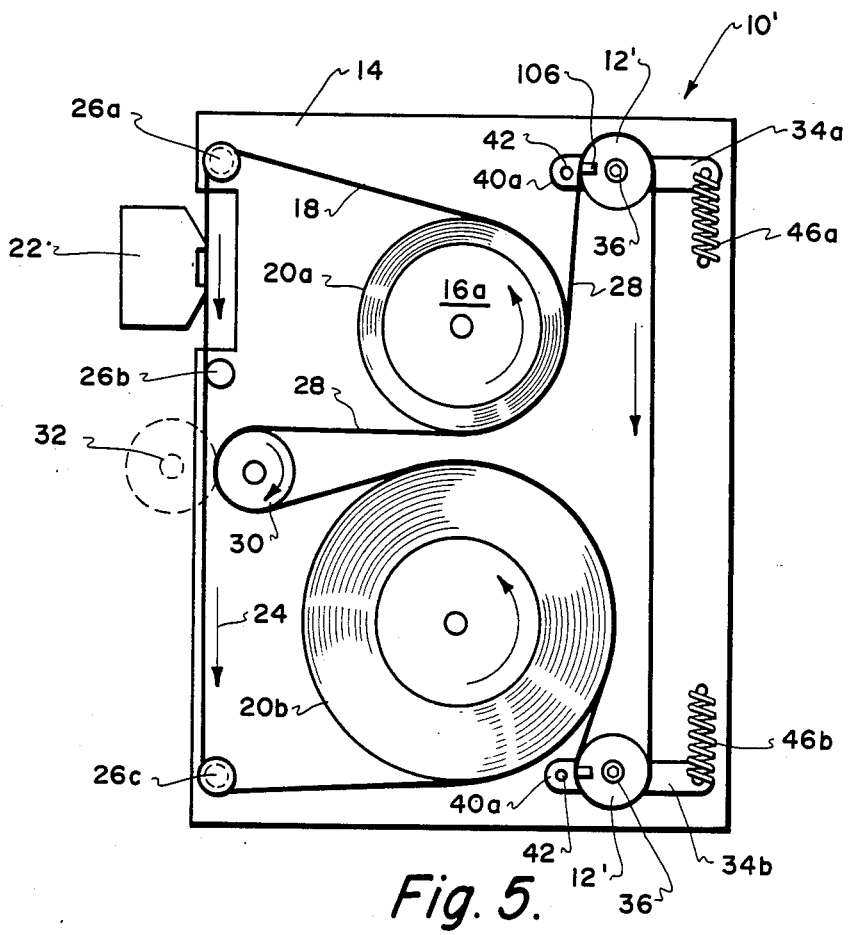
FIG. 5 is a plan view of yet another embodiment of a magnetic tape cartridge employing the apparatus according to the present invention for tensioning the reel driving belt.

Referring now to FIG. 5, an alternative embodiment for a cartridge 10' is shown. In this embodiment each or one of the idlers 34a and 34b (FIG. 1) is replaced by an tensioning apparatus 12 according to the present invention. In this fashion, idlers 48 and 50 (FIG. 1) may be dispensed with.

Figure 6A:
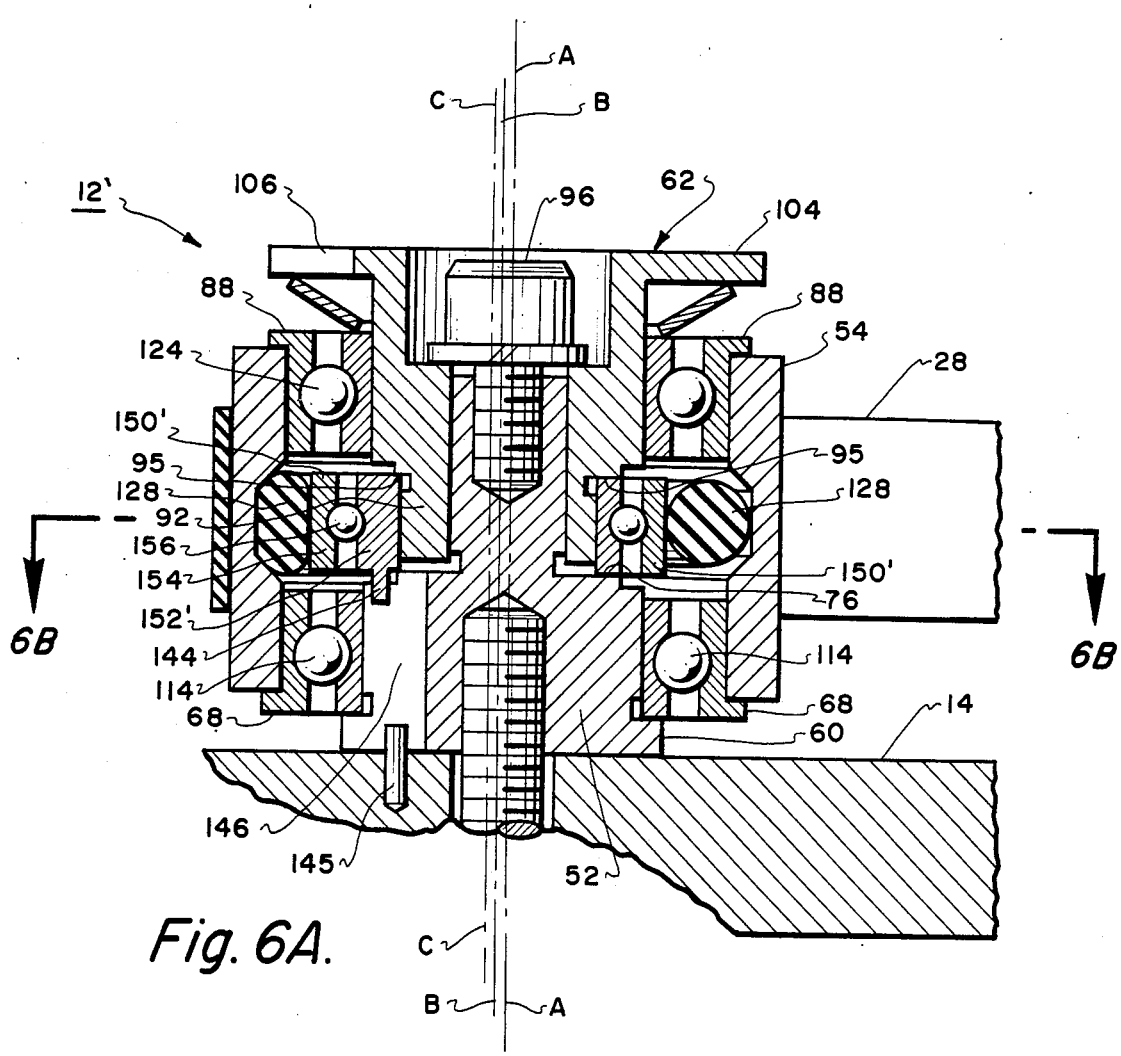
FIG. 6A is a side section view of the preferred embodiment of the apparatus according to the present invention.
Figure 6B:
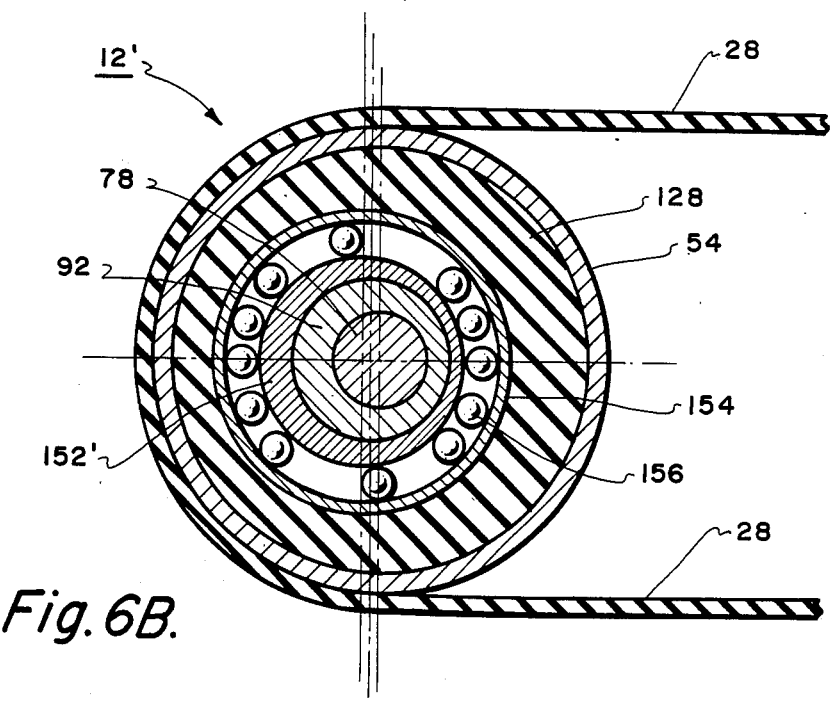
FIG. 6B is a plan view of the apparatus taken along line 6B—6B of FIG. 6A in the direction of the appended arrows.

Referring now to FIGS. 6A and 6B, the preferred embodiment for the tensioning apparatus 12' is shown. Components similar to those described above carry the same reference numerals. Modified components will carry a prime (') designation.

According to the preferred embodiment, the cap 62 is identical to the one shown in FIG. 2 and includes the shoulder 95. By tightening the screw 96 the cap 62 forcibly clamps an eccentric inner race 152' for the third bearing set 150' between the shoulder 95 and the shoulder 76 of the fixed base 60 and renders it frictionally fixed against rotation.

To provide the eccentrically variable rolling means the eccentric inner race 152' is additionally eccentrically disposed about the leg 92. That is, relative to the axis B for the leg 92, which is displaced to the left of axis A, inner race 152' has an axis C which is displaced to the left, in FIGS. 6A and 6B, relative to axis B. The inner race 152' includes pin 144 received by slot 146 to prevent rotation of the inner race 152' during the adjustment of eccentricity. Outer race 154 is journalled about the inner race 152' by a plurality of bearing balls 156.

As the endless belt 28 is circulated, the outer sleeve 54 and visco-elastic ring 128 mutually rotate about the shaft 52 and its axis A. The outer race 154 for the third bearing set 150', by virtue of the eccentricity of the leg 92 and inner race 152', rolls along with the sleeve 54 and ring 128 and compresses the ring against the outer sleeve along a portion of the ring's circumference. As the rotating ring 128 is released an energy loss results from visco-elastic recovery of the ring 128 which, in turn, opposes the rotation of the outer sleeve 54. Ultimately, drag torque is imposed on and tensions the belt 28.

The eccentricity of the outer race 154 can be varied by rotation of the cap 62 relative to the base 60 as described above.

The embodiment described above with reference to FIGS. 6A and 6B does not require the inner sleeve 140 of the embodiment of FIGS. 2-4.

While I have shown and described certain embodiments of the strip media tensioning apparatus, it is to be understood that it is subject to many modifications without departing from the spirit and scope of the invention. For example, the apparatus could be used where the reel packs instead of being arranged in a horizontal manner are arranged coaxially. Further, the first and second bearing sets could be roller type bearings.

I claim:

1. An apparatus for applying drag to a moving band comprising:
   a first shaft;
   an outer sleeve journalled to be concentric with said shaft at all times for rotation about said shaft, the moving band engaging said outer sleeve;
   a visco-elastic ring disposed between said shaft and sleeve; and
   means for rolling and for compressing said ring against said outer sleeve, said means for rolling and compressing adapted to be disposed eccentrically about said shaft, compression of said ring imposing a drag torque upon the rotation of said outer sleeve and the moving band in an amount related to the degree of eccentricity of said means for rolling and compressing.

2. The apparatus of claim 1 wherein said rolling and compressing means includes an inner bearing set having an inner race adapted to be positioned eccentrically about said shaft and an outer race journalled about said inner race, said outer race rolling against and compressing said ring.

3. The apparatus of claim 2 wherein said means for rolling and compressing is eccentrically adjustable.

4. The apparatus of claim 3 wherein said shaft includes an eccentric portion, said inner race disposed eccentrically about said eccentric portion.

5. The apparatus of claim 1 wherein said means for rolling and compressing includes eccentric mounting means having an inner sleeve eccentrically disposed about said shaft.

6. The apparatus of claim 1 wherein said means for rolling and compressing includes eccentric mounting means having an inner sleeve eccentrically disposed about said shaft.

7. The apparatus of claim 6 wherein said means for rolling and compressing includes a bearing set having an inner race disposed about said inner sleeve and an outer race to roll against and compress said ring.

8. The apparatus of claim 6 wherein said inner sleeve is fixed to said shaft against rotation.

9. The apparatus of claim 1 including eccentric mounting means having an eccentric inner sleeve which is mounted about an eccentric portion of said shaft, said inner sleeve mounting said means for rolling and compressing, and means for positioning said shaft eccentric portion to displace said inner sleeve to adjust the eccentricity of said means for rolling and compressing and the compression of said ring against said outer sleeve to adjust drag.

10. An apparatus for applying drag to a moving band comprising:
a first shaft including a fixed base coaxially mounting a cap having an eccentric leg;
an outer sleeve journalled for rotation about said shaft, the moving band engaging said outer sleeve;
a visco-elastic ring disposed between said shaft and outer sleeve;
means for rolling and for compressing said ring against said outer sleeve, said means for rolling disposed eccentrically about said shaft, compression of said ring imposing a drag torque upon the rotation of said outer sleeve and the moving band; and
eccentric mounting means having an eccentric inner sleeve which is mounted about an eccentric portion of said shaft, said inner sleeve mounting said means for rolling and compressing and means for positioning said shaft eccentric portion to displace said inner sleeve to adjust the eccentricity of said means for rolling and compressing and the compression of said ring against said outer sleeve to adjust drag said eccentric inner sleeve being positioned eccentrically about said leg and said means for rolling and compressing disposed about said inner sleeve, said cap being rotatable relative to said base to eccentrically rotate said leg and displace said sleeve to adjust the compression of said ring against said outer sleeve.

11. The apparatus of claim 10 wherein said sleeve is fixed against rotation, said sleeve being radially displaceable by said leg.

12. The apparatus of claim 11 wherein said inner sleeve includes a pin received by a slot in said base to fix said sleeve to said base against rotation.

13. A strip media cartridge of the type including a pair of reel packs between which strip media is transferred, a driven, elastic belt circulated in the cartridge and contacting and rotating the reel packs for the transfer of the strip media, and means for locally tensioning the belt to urge one of the reels to acquire strip media faster than the other reel is paying out strip media, the improvement in the tensioning means comprising:
a fixed shaft,
a sleeve journalled for rotation about said shaft, the belt engaging and rotating said sleeve,
a visco-elastic ring disposed between said shaft and said sleeve, and
means for rolling against said ring disposed eccentrically about said shaft and for compressing said ring to impose a drag torque on said sleeve to tension the belt.

14. The cartridge of claim 13 wherein said means for rolling includes an inner bearing set having an eccentric inner race and an outer race journalled about said inner race and rolling against and compressing said ring.

15. The cartridge of claim 14 wherein said inner race is disposed about an eccentric portion of said shaft.

16. The cartridge of claim 15 wherein said eccentric shaft portion is movable to adjust the eccentricity of said inner bearing set outer race.

17. An apparatus for applying a drag torque to a moving band comprising:
a shaft defined by a fixed base and a cap, said cap being rotatable relative to said base;
an outer sleeve journalled about said shaft, the moving band engaging and rotating said outer sleeve about an axis A;
a visco-elastic ring disposed about the inner surface of said outer sleeve;
a cylindrical leg defined on said cap having an axis B which is offset with respect to said axis A;
an inner bearing set having an outer race journalled about said shaft for rotation about an axis C which is offset with respect to axis B, said outer race rolling against and compressing said ring to impose a drag torque thereon to tension the band, rotation of said cap changing the offset of axis C with respect to axis A to alter the eccentricity of said outer race and the drag torque.

18. The apparatus of claim 17 including a cylindrical inner race for said inner bearing set having said axis C and positioned eccentrically about said leg, said outer race journalled about said inner race.

19. The apparatus of claim 17 including an inner sleeve housing said axis C and positioned eccentrically about said leg, said inner bearing set disposed about said sleeve.

* * * * *